(12) United States Patent
Hu et al.

(10) Patent No.: US 6,456,611 B1
(45) Date of Patent: Sep. 24, 2002

(54) CDMA MODEM USING COMMON BLOCK ARCHITECTURE

(75) Inventors: Lan Hu, Nepean; Wendy Cheung, Kanata, both of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/205,801

(22) Filed: Dec. 4, 1998

(51) Int. Cl.$^7$ ............................................... H04B 7/216
(52) U.S. Cl. ...................... 370/342; 370/209; 370/328; 370/335
(58) Field of Search .................. 370/203, 209, 370/277, 278, 310, 328, 334, 335, 342; 714/701, 752, 756, 758, 776; 375/148, 145

(56) References Cited

U.S. PATENT DOCUMENTS

| | | | | |
|---|---|---|---|---|
| 5,511,067 A | * | 4/1996 | Miller ......................... | 370/335 |
| 5,623,485 A | * | 4/1997 | Bi .............................. | 370/209 |
| 5,659,569 A | * | 8/1997 | Padovani et al. ........... | 370/479 |
| 5,999,815 A | * | 12/1999 | TenBrood et al. .......... | 455/436 |
| 6,088,347 A | * | 7/2000 | Minn et al. ................. | 370/342 |
| 6,173,006 B1 | * | 1/2001 | Kent et al. .................. | 375/145 |
| 6,175,588 B1 | * | 1/2001 | Visotsky et al. ............ | 375/148 |

OTHER PUBLICATIONS

Knisely et al., Evolution of wireless Dant Services: IS–95 to cdma2000 Oct. 1998, Lucent Technologies, (IEEE Communications Magazine pp. 140–149).*

Carr, A., Development and trials for W–CDmA infrastructure Nov. 1998, Telecom MODUS Ltd, (1998 The Institution of Electrical Engineers. Printed and published by the IEE, Savoy Place, London WC2R OBL, UK.).*

* cited by examiner

*Primary Examiner*—Hassan Kizou
*Assistant Examiner*—Saba Tsegaye
(74) *Attorney, Agent, or Firm*—Gibbons, Del Deo, Dolan, Griffinger & Vecchione

(57) ABSTRACT

A CDMA modem for use in a CDMA base station for communicating with a plurality of mobile stations each of which may communicate according to any of a plurality of air interface standards is hard-wired only to the extent necessary for functions common to all of the air interface standards. Remaining functions are software-configurable so as to be adaptable for any of the air interface standards.

34 Claims, 23 Drawing Sheets

CDMA MODEM USING COMMON BLOCK ARCHITECTURE

FIELD OF THE INVENTION

This invention pertains to modems, particularly to modems for use in CDMA (Code Division Multiple Access) radio systems, and most particularly to modems able to function in any of several different generations or standards of CDMA radio systems.

BACKGROUND OF THE INVENTION

CDMA radio systems are well known. See, generally, CDMA *Cellular Mobile Communications and Network Security*, Dr. Man Young Rhee, Prentice Hall 1998, ISBN 0-13-598418-1.

Currently,"second generation" CDMA systems, often referred to in the art as "2G" systems, governed by standard TIA/EIA/IS-95, hereinafter"IS-95", are widely used. The third generation of CDMA systems, such as cdma2000 and UMTS UTRA systems are being introduced as a extensions of IS-95 systems.

Each of those three systems has to date required the use of different terminals or base stations for different air interface standards. This results in great inconvenience to consumers and burdens the service providers with extra operating costs.

There is thus a need to provide CDMA equipment that can function under each of the IS-95, UMTS UTRA, and cdma2000 standards.

It is thus an object of the present invention to provide an efficient soft modem architecture that can accommodate third generation (cdma2000, UMTS UTRA) and one second generation (IS-95) standards.

It is a further object of the present invention to provide a CDMA modem that is configurable over a broad range of uses.

It is a further object of the present invention to provide a CDMA modem definable by software.

SUMMARY OF THE INVENTION

In accordance with the teachings of the present invention, these and other objects may be accomplished by the present systems and methods in a modem configurable to operate in a variety of environments each representing a different air interface standard. An embodiment of the present invention includes a method of CDMA communication comprising configuring the components of a modem which are common to the cdma2000, UMTS UTRA, and IS-95 air interface standards as hard-wired components, and configuring the components unique to each of those air interface standards as software-configurable components. Another embodiment of the present invention comprises a modem with hard-wired circuitry to perform functions common to those three air interface standards and software-configurable elements to perform functions unique to any of those three air interface standards.

BRIEF DESCRIPTION OF THE DRAWINGS

The invention will be more clearly understood by reference to the following detailed description of an exemplary embodiment in conjunction with the accompanying drawings, in which.

DESCRIPTION OF THE INVENTION

Figure 22:
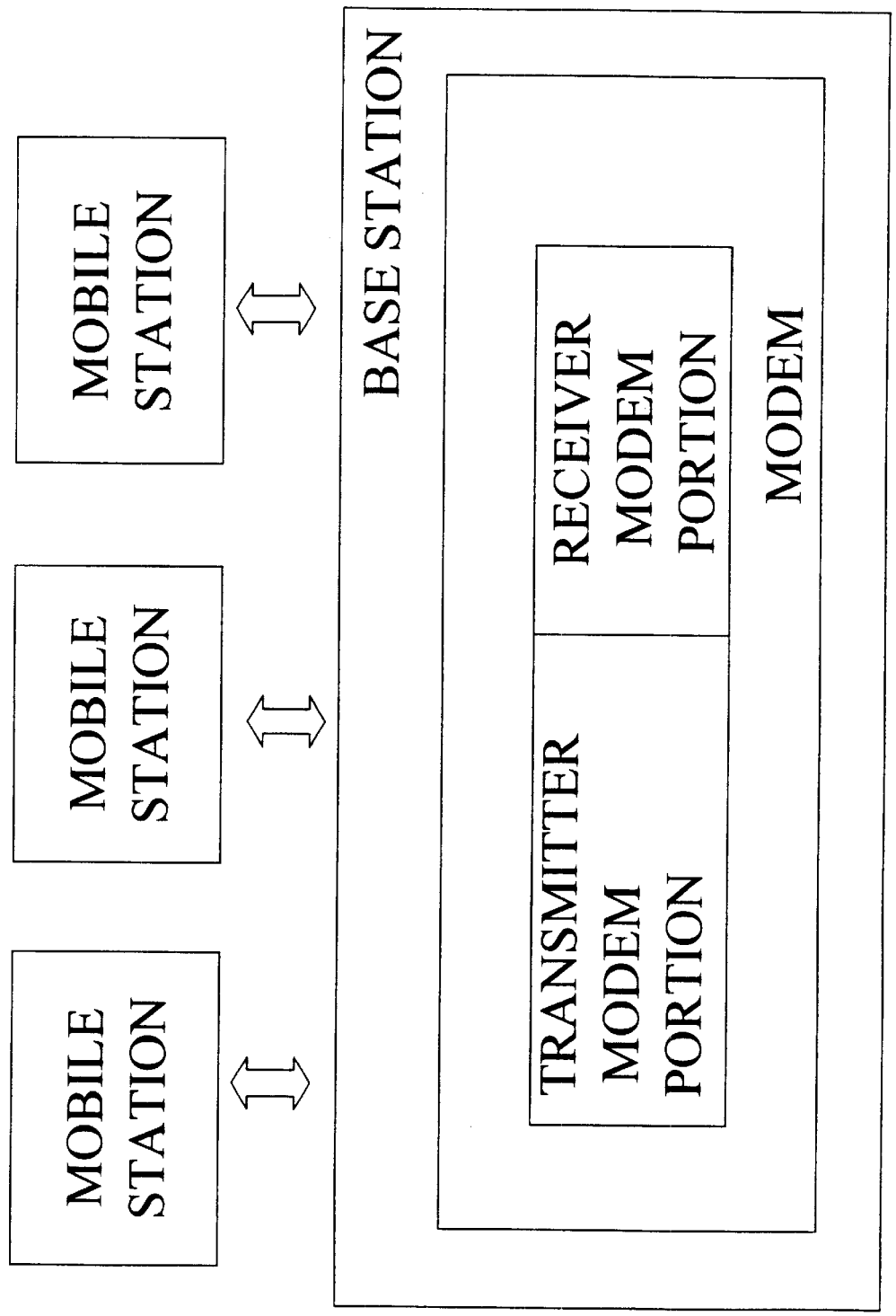
FIG. 22 is a block diagram showing the relationship between the modem base station and the mobile stations.

As best seen in FIG. 22, the present invention includes a modem for use in a base station, and which is adaptable to work with a variety of mobile stations, each of which may function according to a different air interface standard. (Each mobile station is typically limited to a single one of the air interface standards.)

Figure 21:
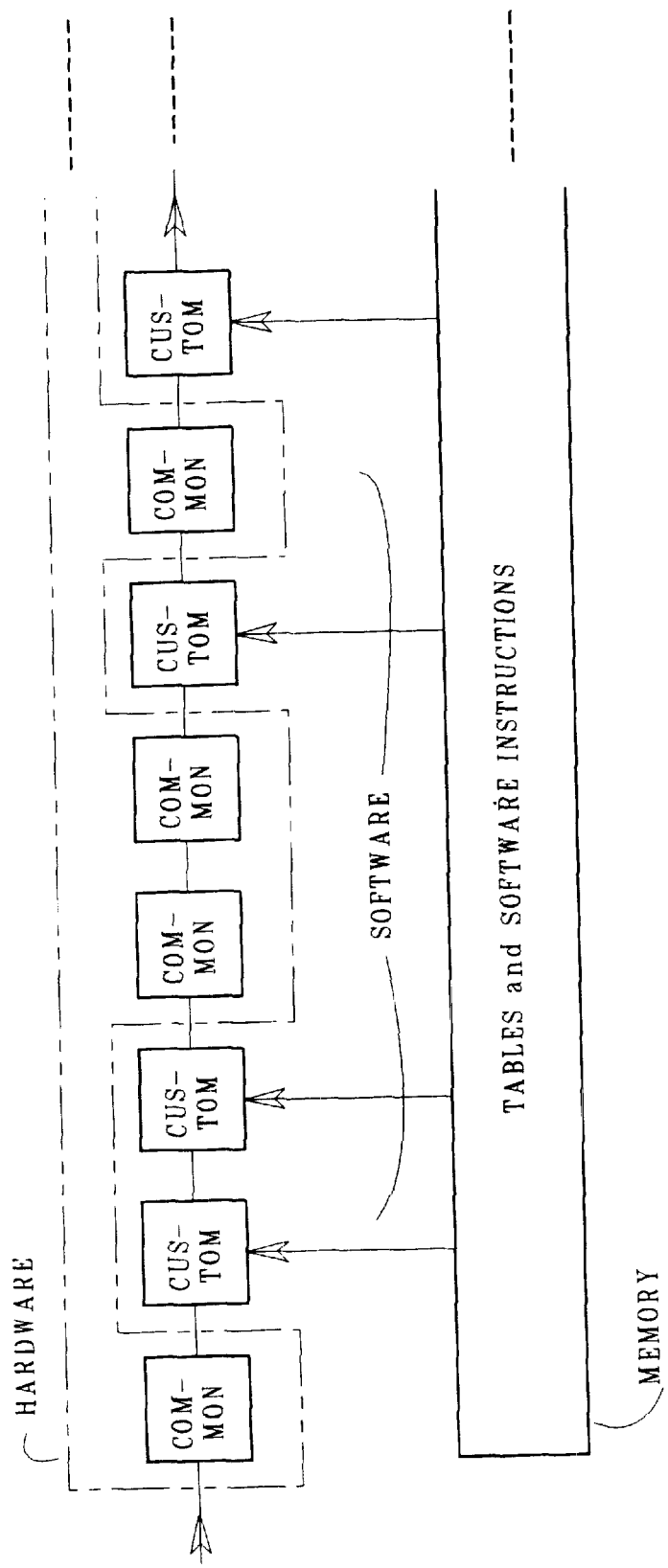
FIG. 21 gives an overview of the concept of the present invention.

The basic operating principle of the invention is that a common modem (i.e., a modem usable for any of a variety of standards can be created by (1) determining which functions are common to all standards, and which are not; (2) providing hardware elements that execute the "common" functions; and (3) providing software configurable modules that execute the "custom" functions particular to each standard. FIG. 21 illustrates this principle.

In one practice of the invention, the "common" functions for forward link transmission include:
Adding CRC and tail bits;
Convolutional encoding;
Symbol repetition and puncture;
Block interleaving;
Long-code scrambling;
Walsh-code spreading; and
I & Q filtering,
while the "custom" forward-link functions include:
Reed-Solomon coding;
Turbo coding;
Addition of reserved bits;
Channel gain;
Power-control bit puncture;
I & Q scrambling; and
Splatter control.
The reverse-link "common" functions include:
Front-end interface;
Searchers;
Rake receiver fingers;
Rake receiver combiner;
De-interleaving;
Viterbi decoding;
CRC check; and
BER measurement.
while the reverse-link "custom" functions include:
Reed-Solomon decoding;
Turbo decoding;
Finger and tracking control;
PN code polynomial control; and
Power control decision.
Functions common to both forward link and reverse link include timing generation and generation of codes (such as Long Code, Gold Code, Kasami Code, PN Codes, etc.).

Figure 1:
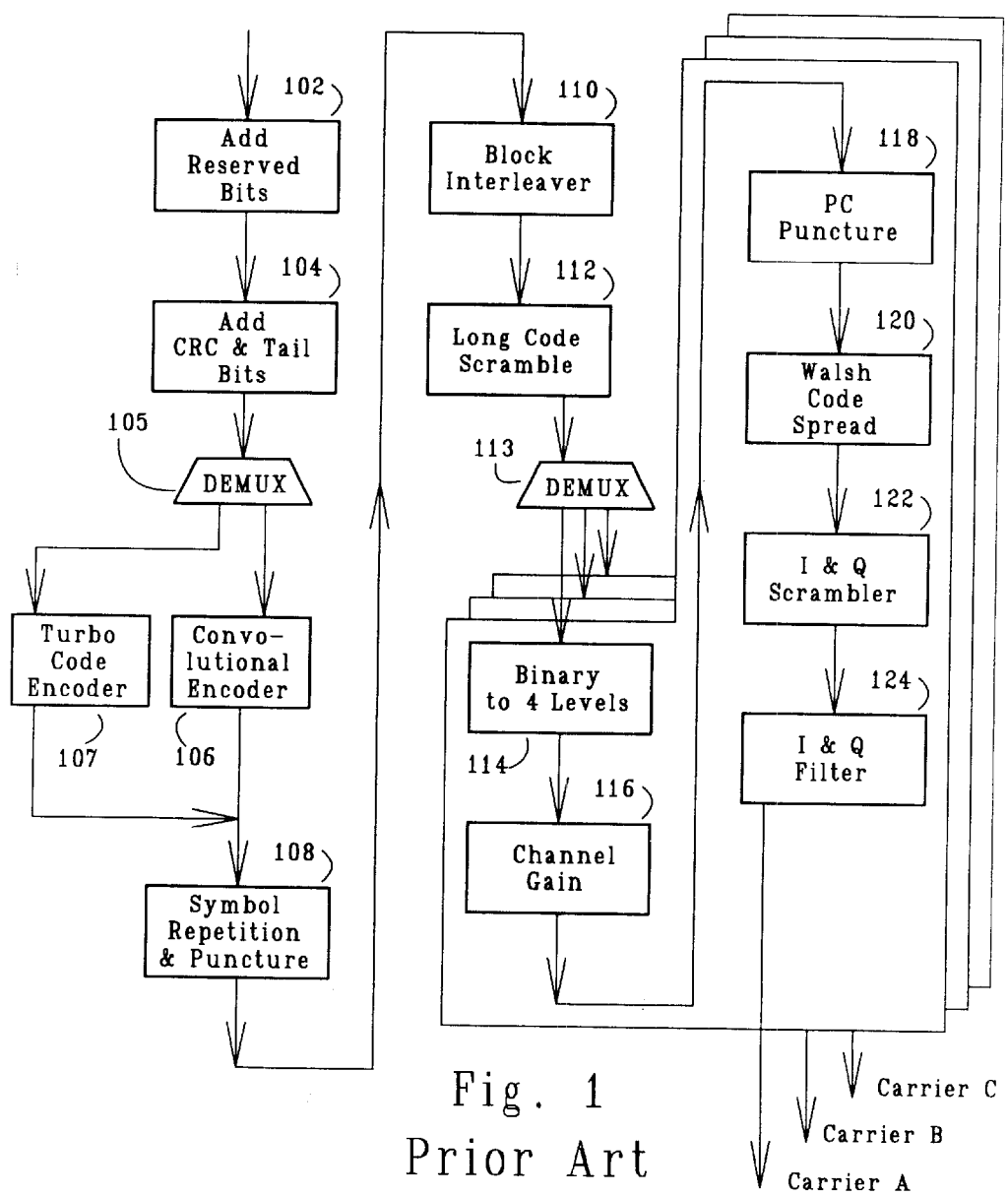
FIG. 1 is a function diagram of a prior-art forward link transmitter for use in a third-generation (cdma2000) CDMA system.
Figure 2:
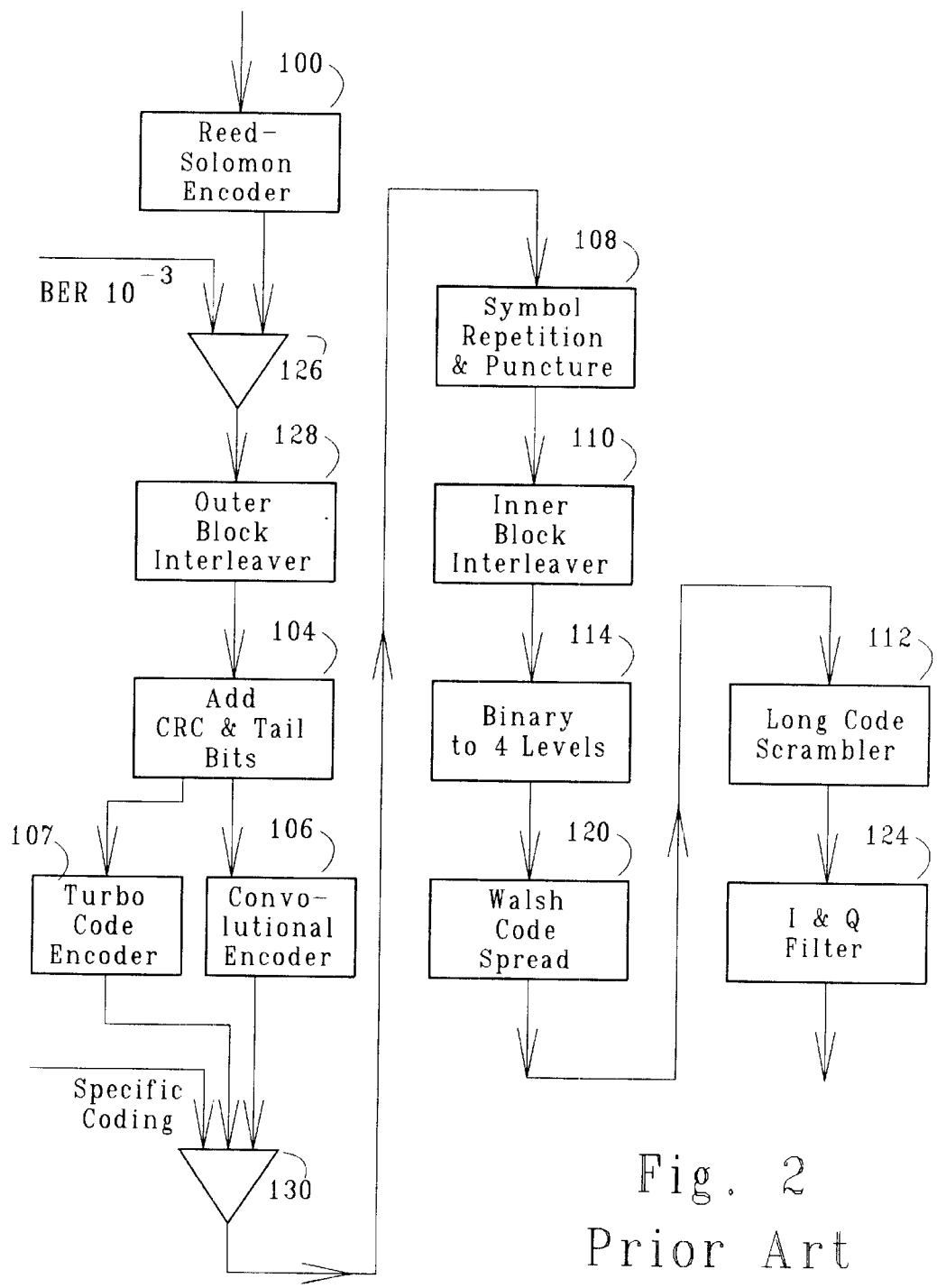
FIG. 2 is a function diagram of a prior-art forward link transmitter for use in a wideband (UMTS UTRA) CDMA system.
Figure 3:
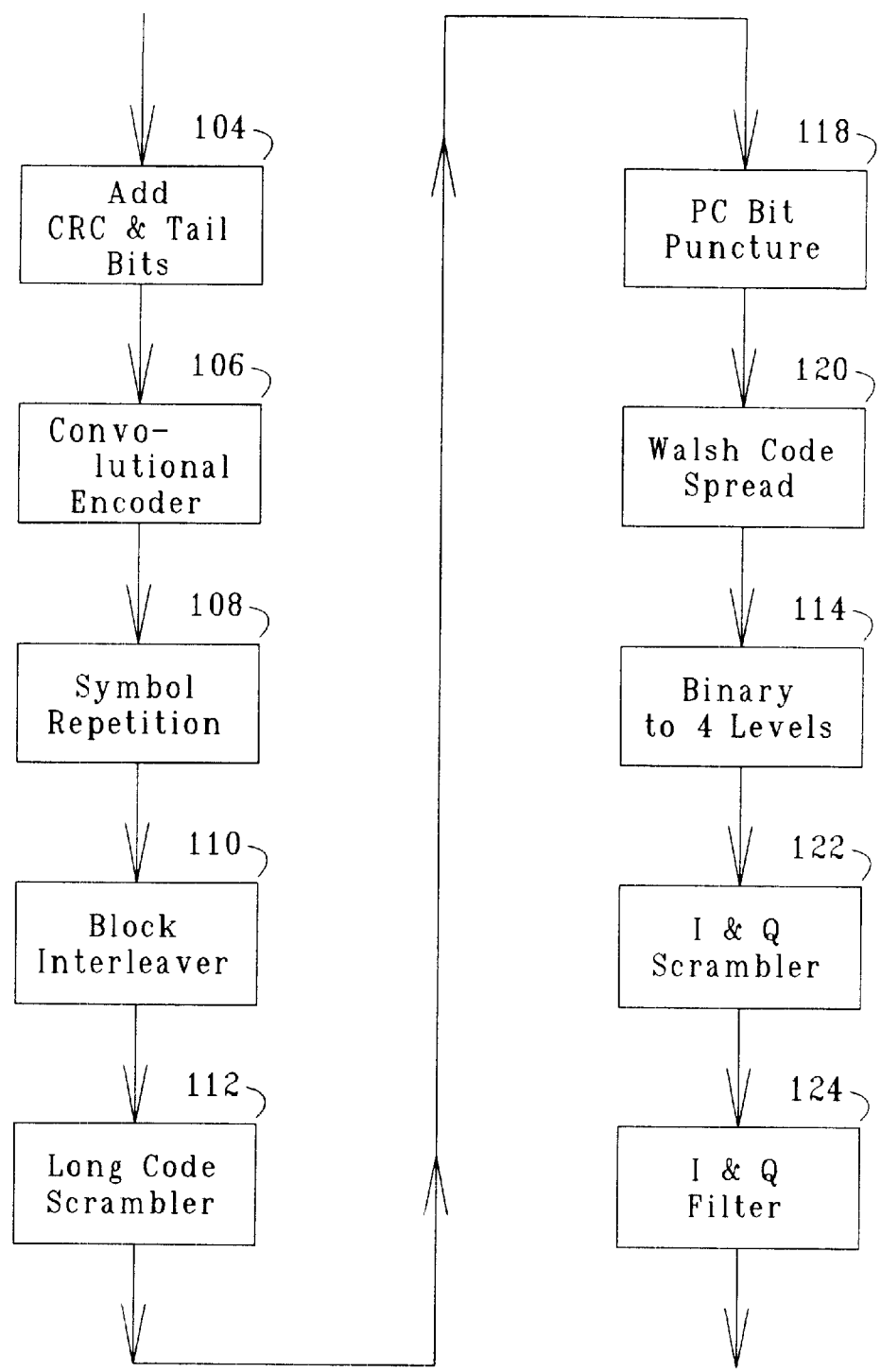
FIG. 3 is a function diagram of a prior-art forward link transmitter for use in a second-generation (IS-95) CDMA system.

FIGS. 1, 2, and 3 are function diagrams of prior-art modems for use in forward link (base station to mobile) transmitters for cdma2000, UMTS UTRA, and IS-95 systems respectively. These figures depict the functions performed by prior-art modems, and thus are not architectural diagrams or circuit schematic diagrams. Although the configurations are different for each of the modes of operation, those skilled in the art will appreciate that based on the cdma2000, UMTS UTRA, and IS-95 standards, many functions are common.

Figure 4:
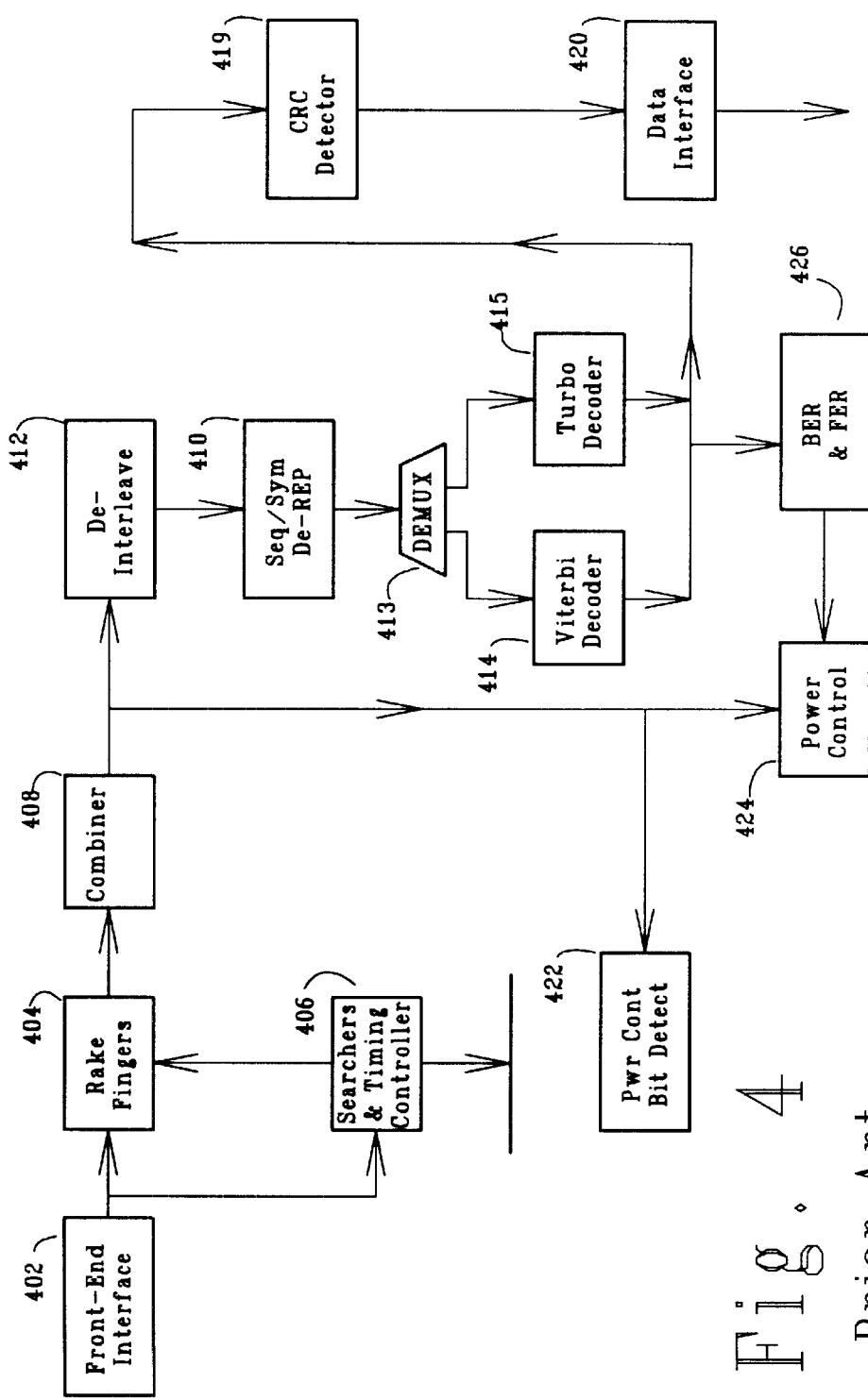
FIG. 4 is a function diagram of a convention reverse link receiver for use in a cdma2000 CDMA system.
Figure 5:
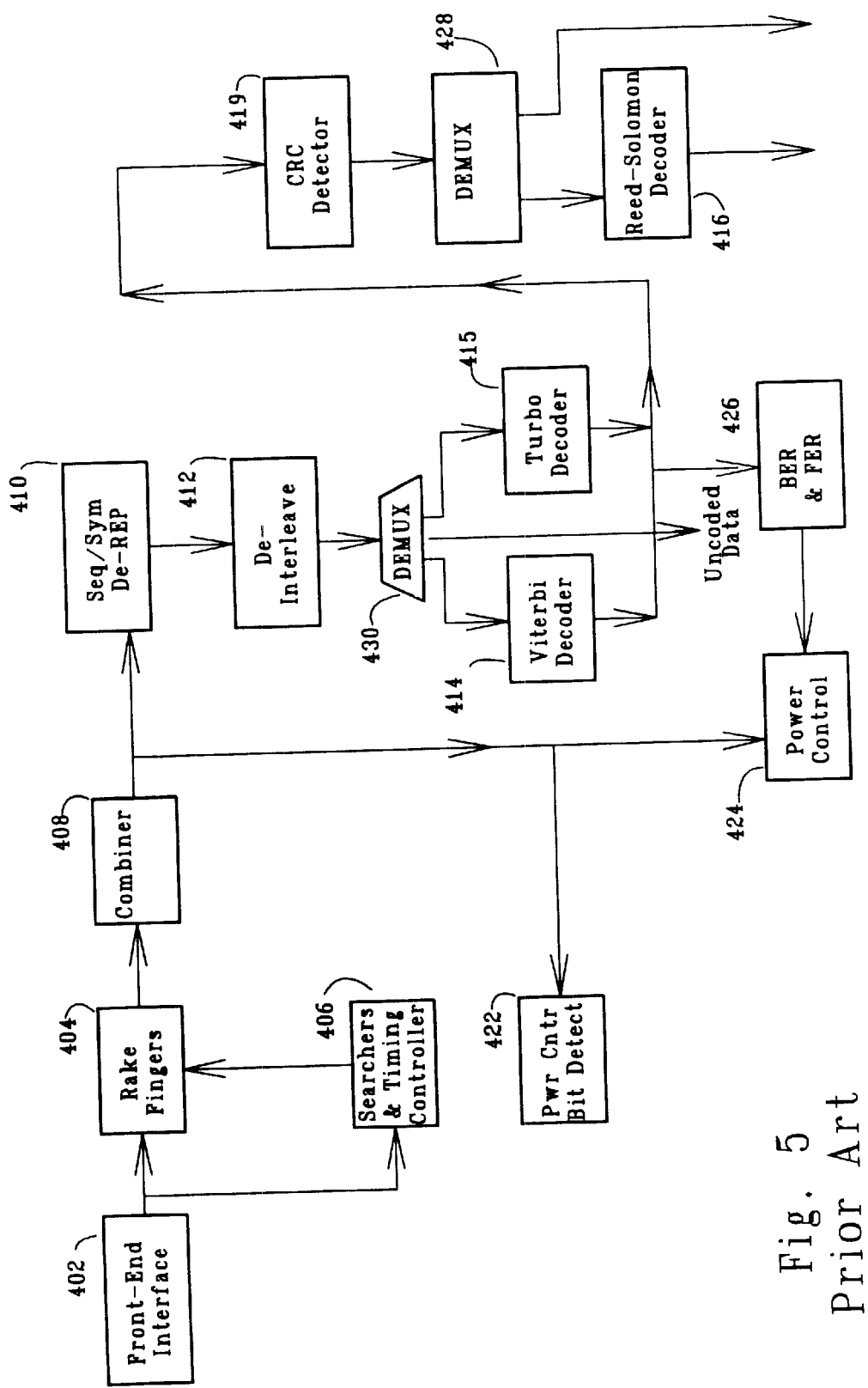
FIG. 5 is a function diagram of a prior-art reverse link receiver for use in a UMTS UTRA CDMA system.
Figure 6:
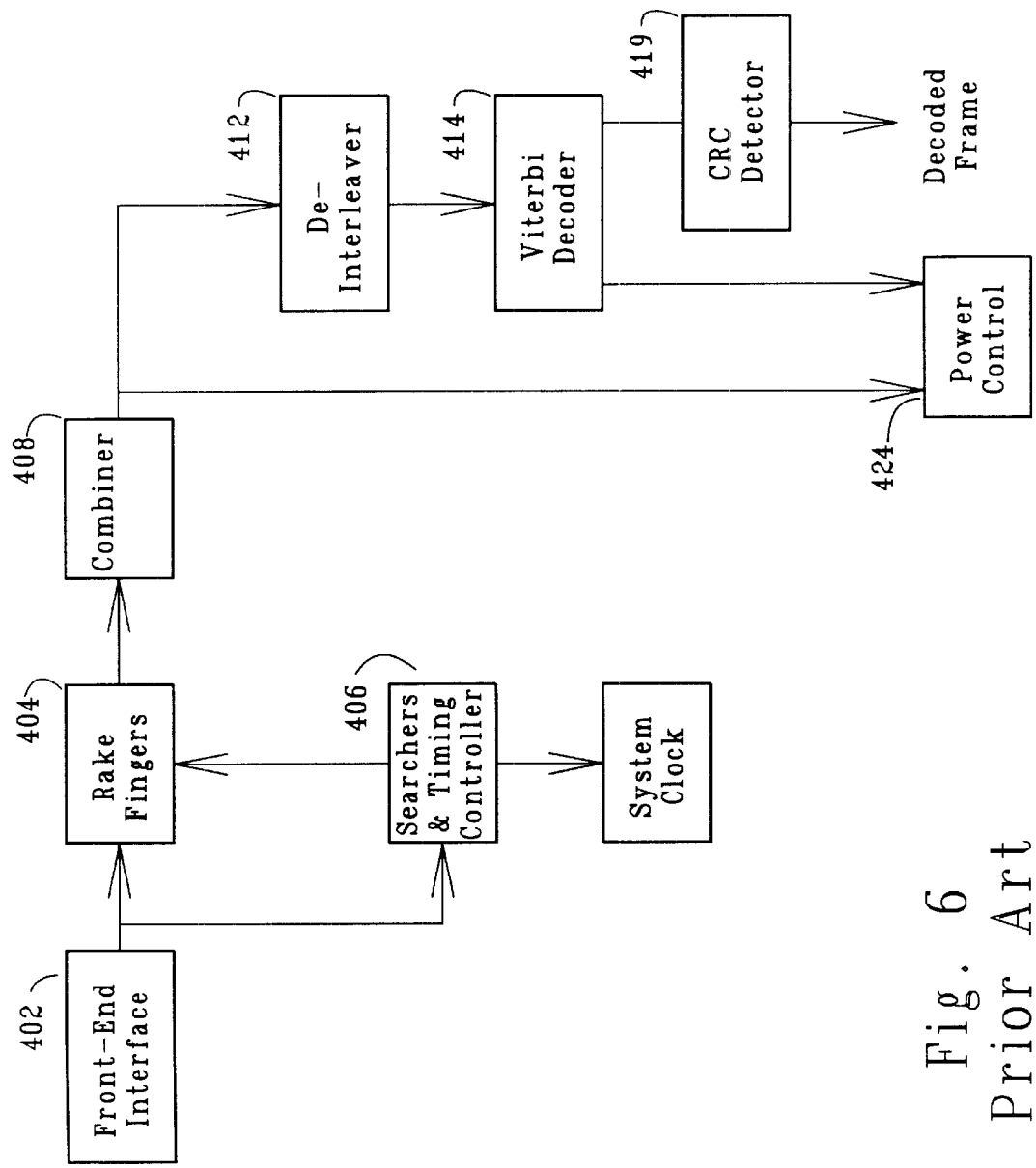
FIG. 6 is a function diagram of a prior-art reverse link receiver for use in a IS-95 CDMA system.

FIGS. 4, 5, and 6 are function diagrams (again, not architectural or circuit schematic diagrams) of prior-art modems for use in reverse link (mobile to base station) receivers for cdma2000, UMTS UTRA, and IS-95 systems respectively. Again, many functions are common among the three system standards. The channel types that are substantially the same among the three interface standards include:
Synchronization channel for the three standards;
Paging channel for the three standards;
Pilot channel for the three standards;
Access channel for the three standards;
cdma2000 fundamental channel and IS-95 traffic channel;
cdma2000 supplemental channel and UMTS UTRA dedicated data channel; and
cdma2000 control channel and UMTS UTRA dedicated control channel.

The present invention provides a modem that can serve as a "common" modem, functional under all three standards. This is done by determining commonality, implementing common portions in hardware, and implementing the remaining unique-to-standard portions in software so that they may be configured when the modem is put into service for a particular standard, and reconfigured when it is put into service for another standard.

The common elements are determined to maximize hardware implementation, and the unique-to-standard elements are determined to minimize software features and to maximize reconfigurability.

The invention further includes a common baseband clock generator for the different standards, and the ability to reconfigure the paging, access, synchronization, and/or control channels, when they are not being used for their respective functions, for use as a traffic channel.

Figure 7:
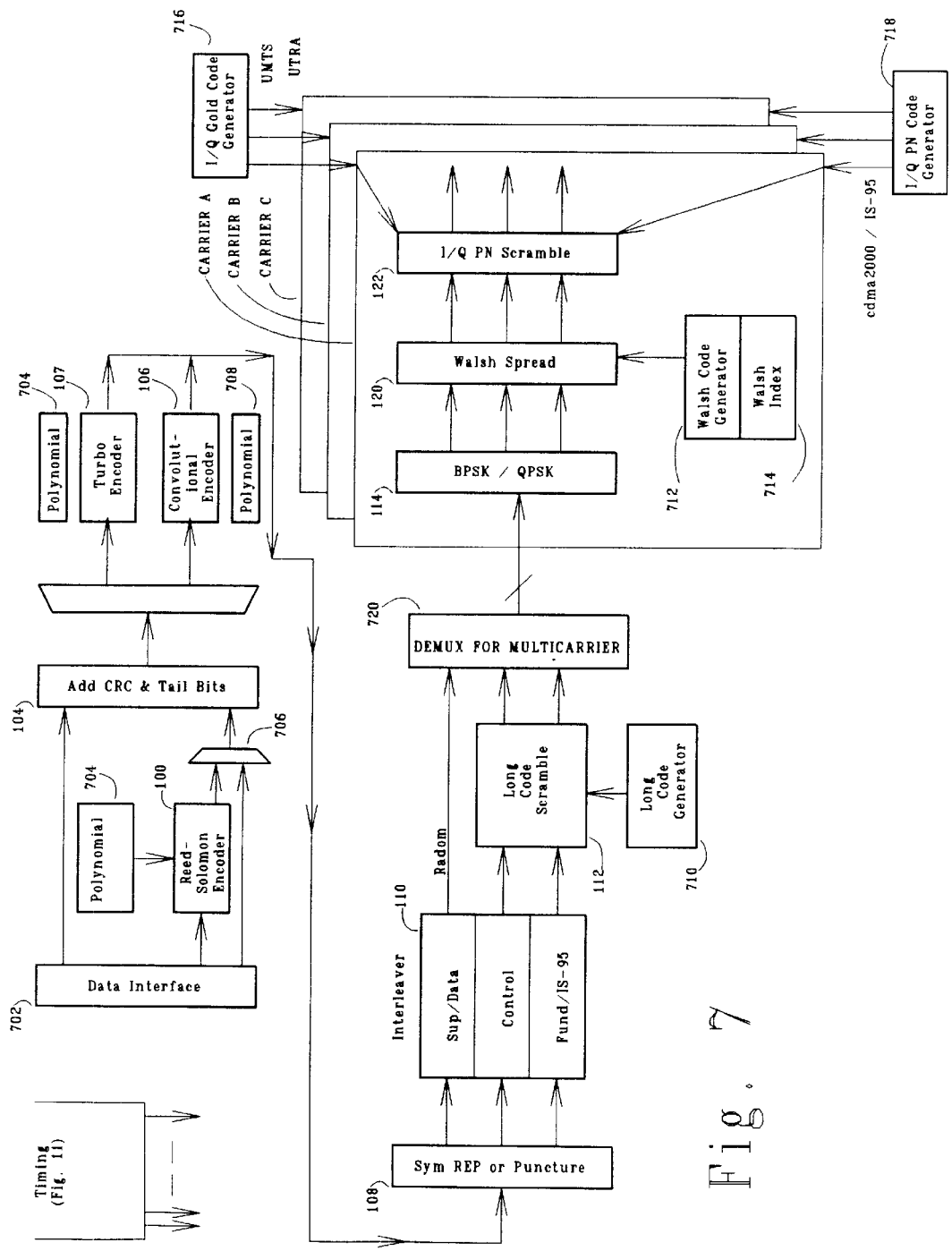
FIG. 7 is an architectural block diagram of a transmitter modem portion of the present invention for use in a common modem in cdma2000, UMTS UTRA, and IS-95 systems.
Figure 8A:
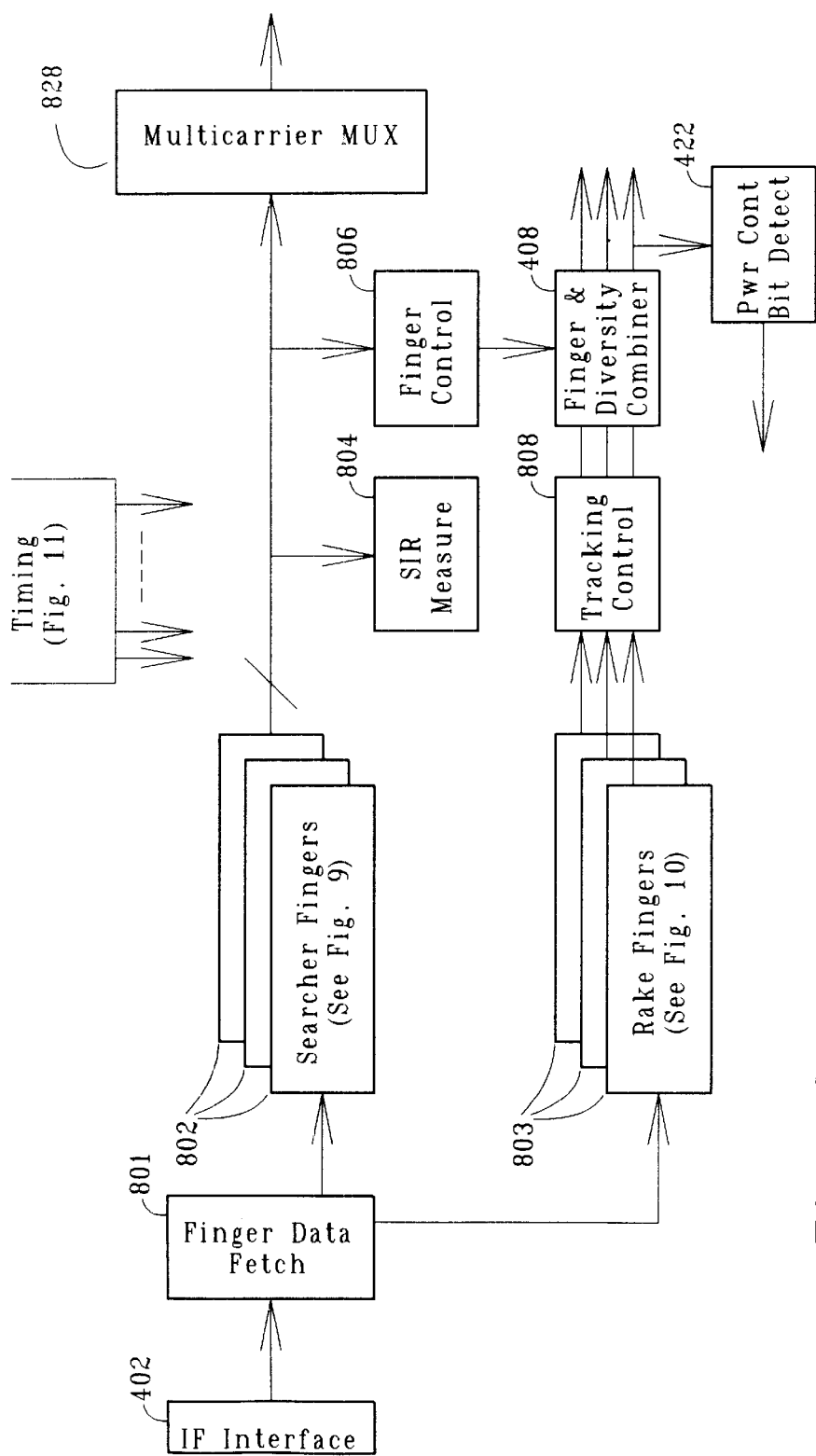
FIGS. 8A and 8B comprise an architectural block diagram of a receiver modem portion of the present invention for use in a common modem in cdma2000, UMTS UTRA, and IS-95 systems.
Figure 8B:
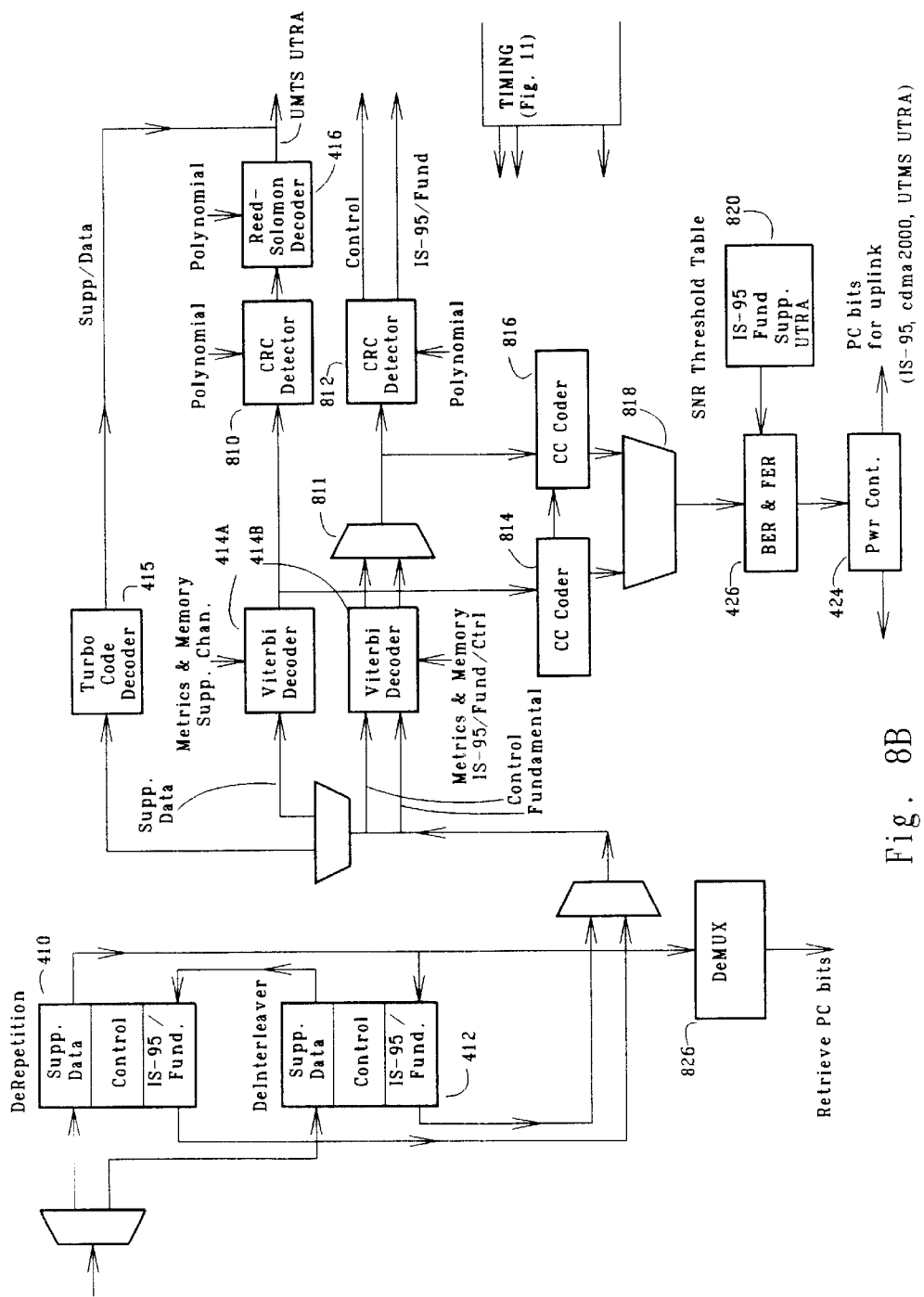

The high-level architecture of the forward-link transmitter portion of such a common modem is shown in FIG. 7, and the reverse-link receiver portion in FIGS. 8A and 8B.

The Common Modem in General

A typical cdma2000 forward link for traffic consists of the fundamental channel, supplemental channel, and control channel. A typical IS-95 forward link for traffic consists of the fundamental channel. A typical UMTS UTRA forward link for traffic consists of the dedicated data channel and the dedicated control channel.

It is economic to implement the data path and functional blocks in hardware, since they are reused for the following channel types among the three standards for air interfaces:
cdma2000 fundamental channel and IS-95 fundamental channel;
cdma2000 supplemental channel and UMTS UTRA dedicated data channel;
cdma2000 control channel and UMTS UTRA dedicated control channel; and
baseband modulator for cdma2000, UMTS UTRA, and IS-95.

Figure 11:
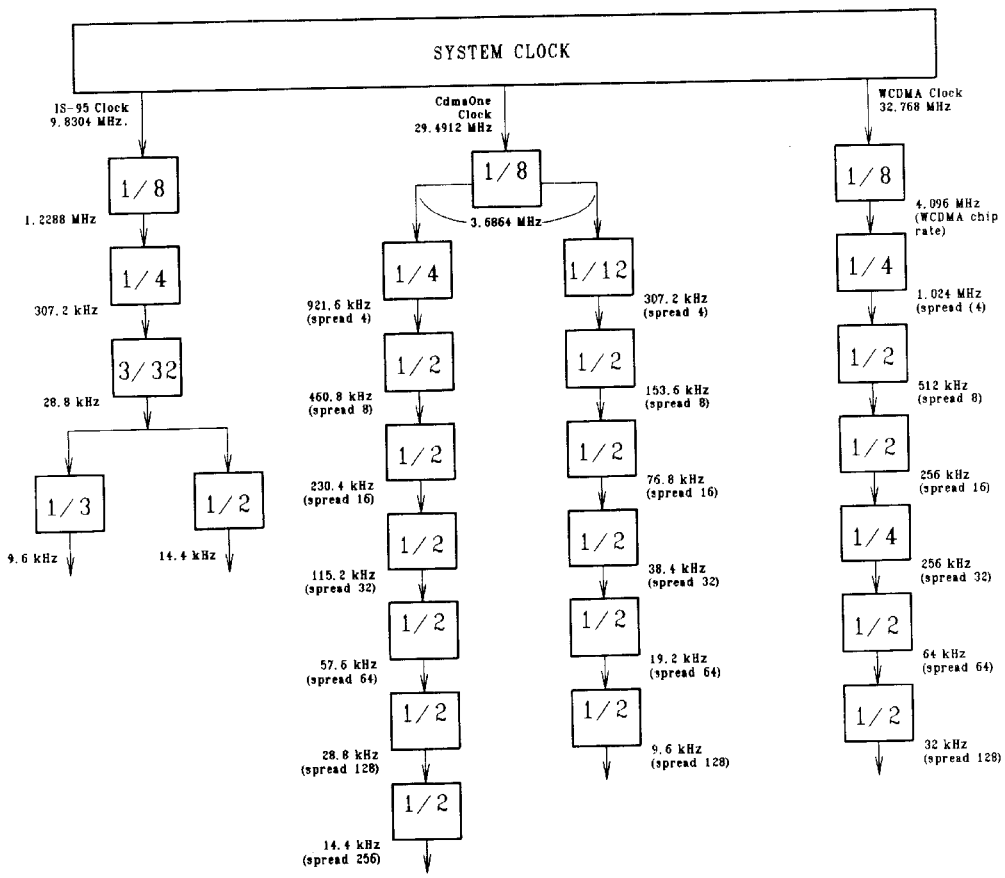
FIG. 11 depicts common clock generation for the modem of the present invention.

The common modem may operate at any of the user data rates occurring in the three standards. An embodiment of the baseband clock generation for different chip rates and data rates is shown in FIG. 11. The many clock rates required are obtained by successive division performed on a small number of clock rates.

The common modem, depending on the air interface standard, chip rate, and user data rate, has a number of configurable parameters for the modem function blocks. These parameters may be hardwired and selectable in the modem, or programmable by modifying modem registers, at the option of the designer.

The Baseband Forward-link Transmitter (FIG. 7)

The elements of FIG. 7 that are common to all or most interface standards and which lend themselves to hardware implementation are
Turbo Code Encloder 107
Reed-Solomon Encoder 100 (bypassed for IS-95 standard);
Data Interface 702;
Add CRC & Tail Bits 104;
Convolutional Encoder 106;
Symbol Repetition and Puncture 108;
BPSK/QPSK modulator 114;
Walsh-Code Spreading 122; and
I & Q PN scrambler 122.

It may be desirable to have polynomials 704 and 708 provided to registers under control of software.

Figure 12:
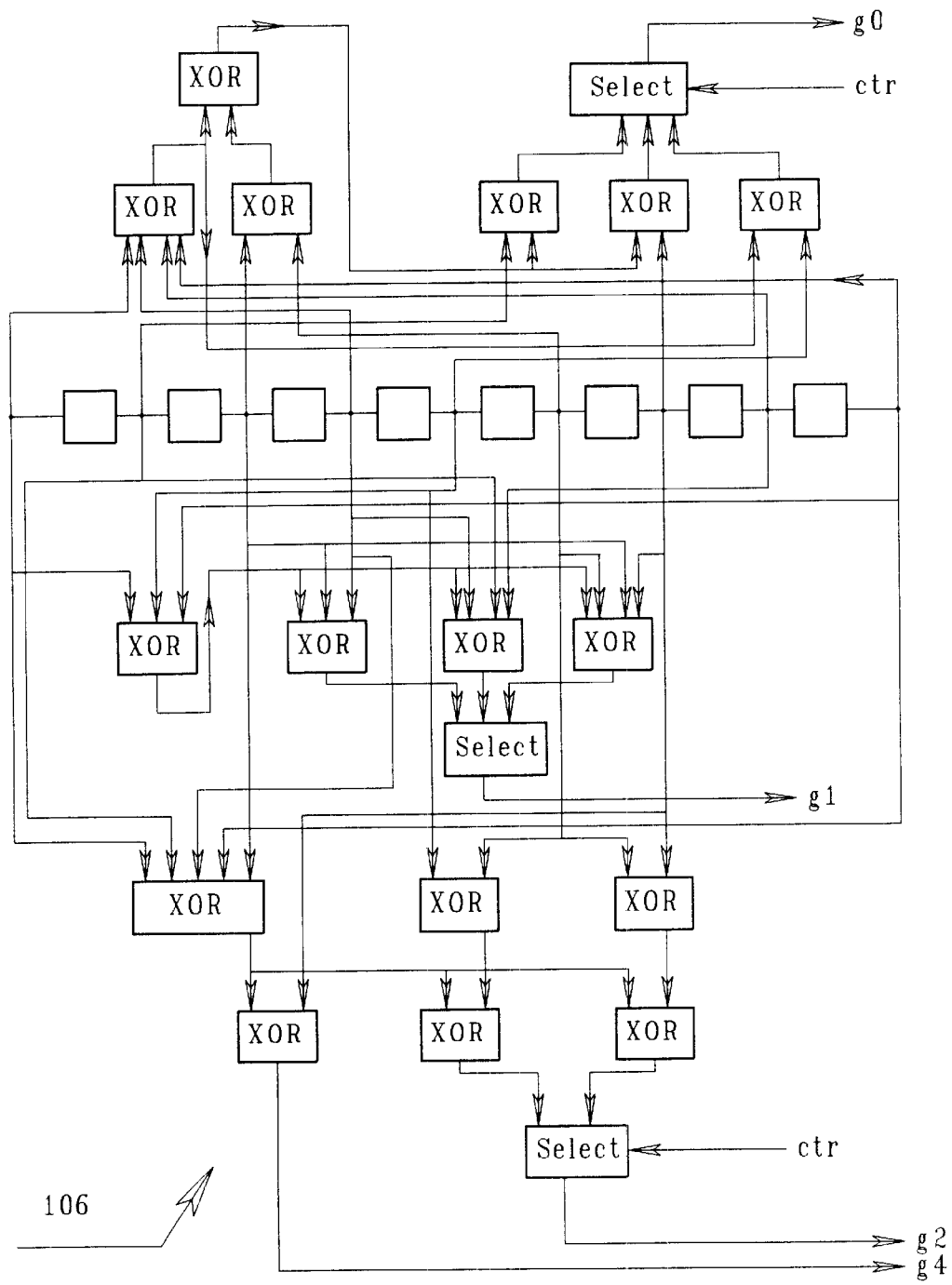
FIG. 12 depicts a convolutional encoder for the modem of the present invention.

One in the art can design the channel encoders (Reed-Solomon encoder 100, convolutional encoders 106) to operate at different selectable clock rates depending on the air interface standard, the channel type, and user data rate, to employ configurable code polynomials, number of parities, and code rate. A block diagram of such a channel encoder is shown in FIG. 12.

The remaining elements of FIG. 7 are more efficiently implemented in software which permits variations required among the different standards to be easily effected.

Figure 14:
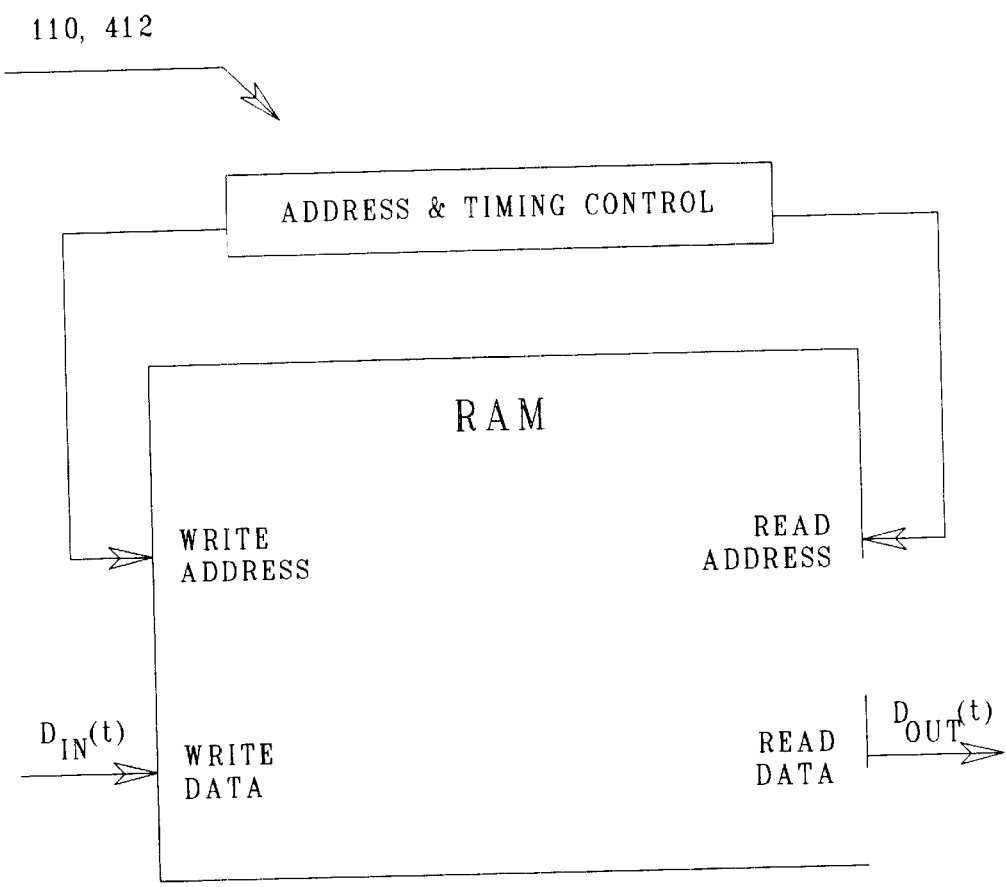
FIG. 14 depicts an interleaver/deinterleaver for use with the present invention.
Figure 15:
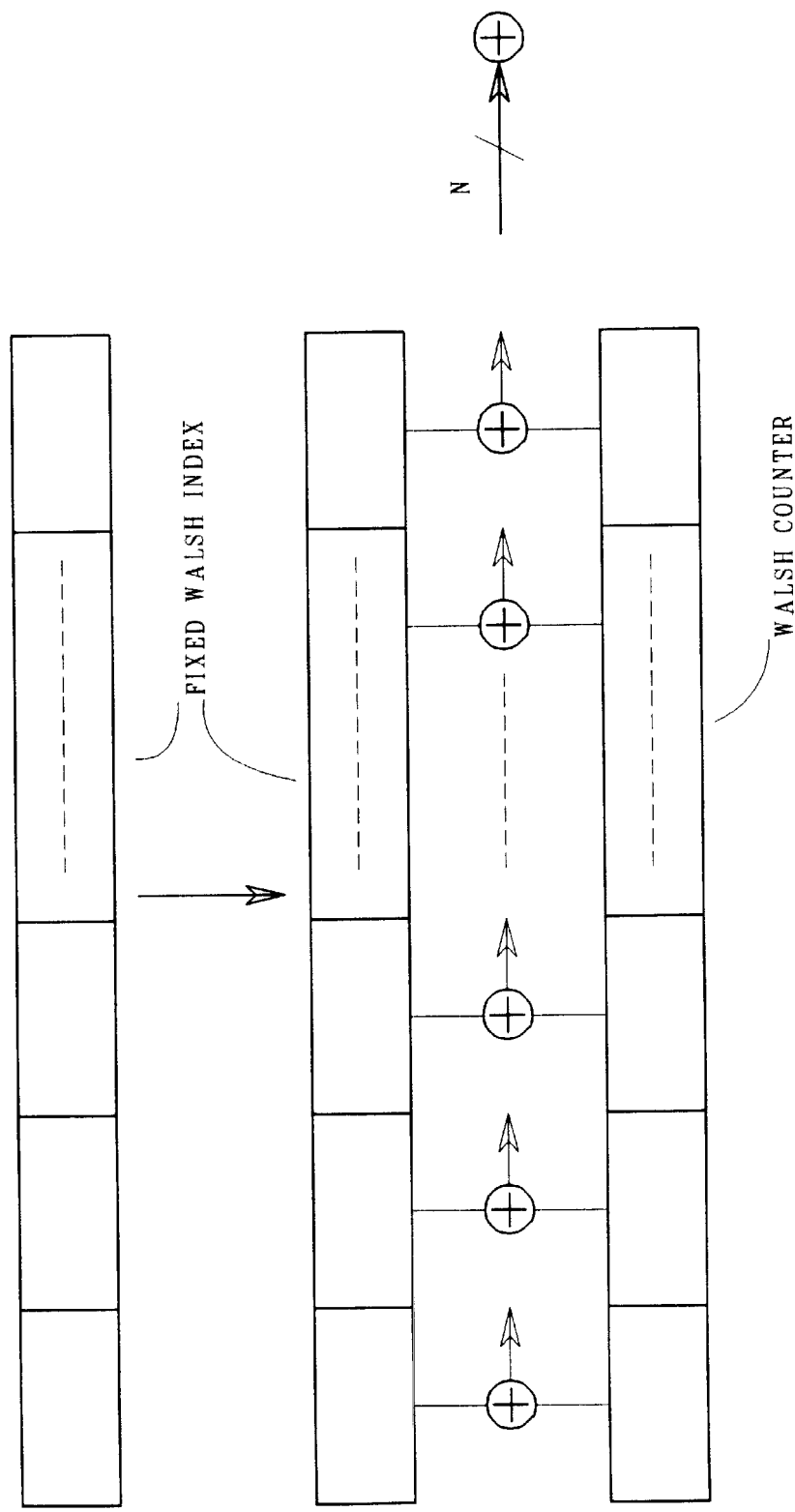
FIG. 15 depicts the Walsh-Code Generator of the present invention.

An embodiment of Interleaver 110 is given in FIG. 14, implemented as a lookup table, software-controlled address generator, and buffer. Depending on the air interface standard, channel type, and user data rate, it provides:

an interleaving memory used for any of the three standards;

configurable read/write address generator;

configurable values of sequence and symbol repetition (108); and configurable values for puncture matrix (108).

Figure 16:
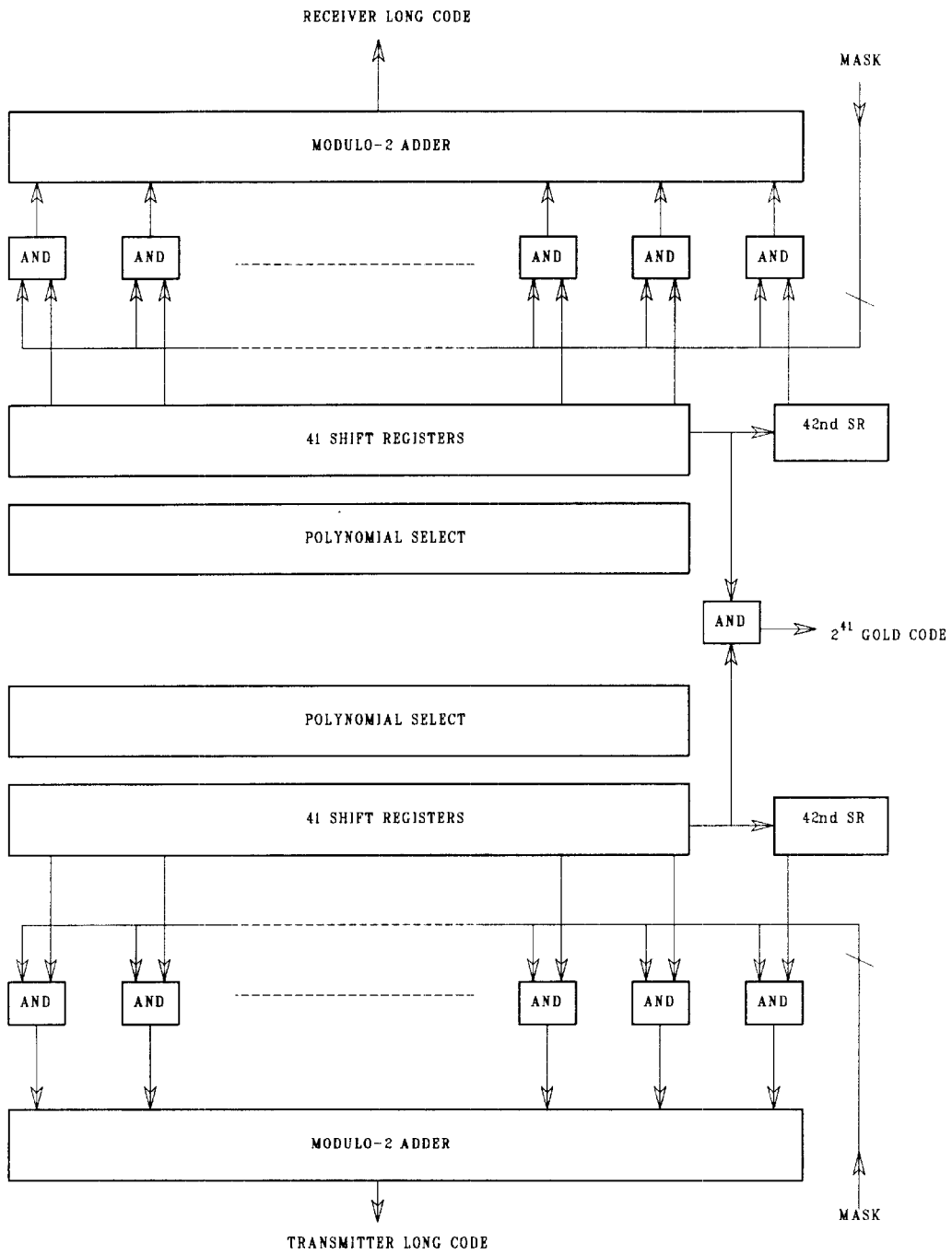
FIG. 16 depicts the Long-Code and Gold-Code Generator of the present invention.

The Long Code generator (also used for Gold Code) is given in FIG. 16. The hardware depicted in FIG. 16 is ideally software-controlled. Clock rate can be selectable depending on the air interface and chip rate. Software can provide a configurable initial state and mask and a configurable polynomial.

Figure 17:
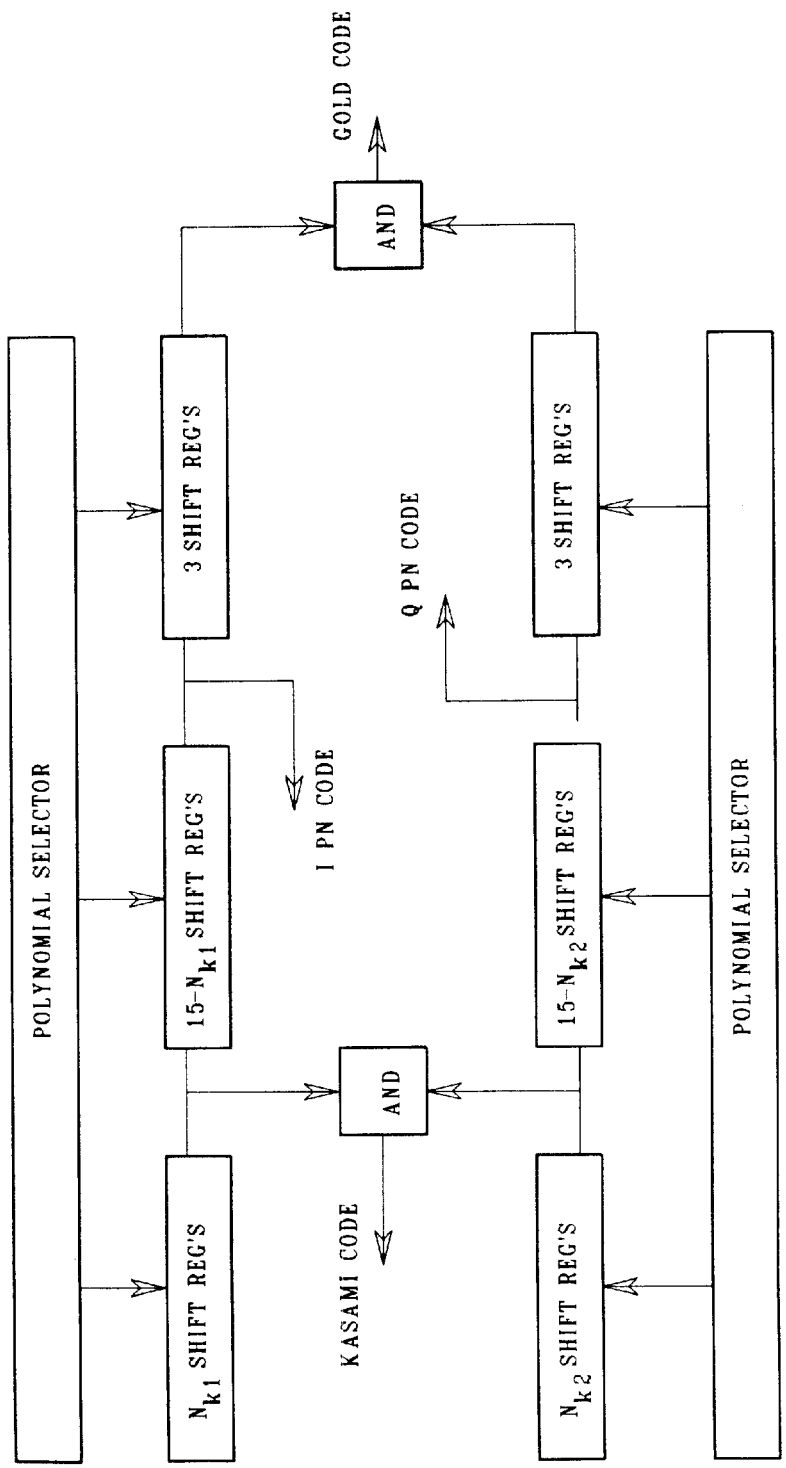
FIG. 17 depicts a generator of the present invention for generating Short Gold Code, I and Q pseudo-noise codes, and Kasami Code.

PN code generation is shown in FIG. 17. The hardware depicted is ideally software controlled.

A DS (direct spread) and MC (multi-carrier) demultiplexer 720 is used to accommodate both direct spread and multi-carrier systems, with Walsh BPSK/QPSK modulation, Walsh spreading, and I/Q PN scrambling provided for each carrier.

Software can specify baseband symbol mapping configured for either BPSK and QPSK modulation for block 114. The Baseband Reverse-link Receiver (FIGS. 8A, 8B)

Figure 9:
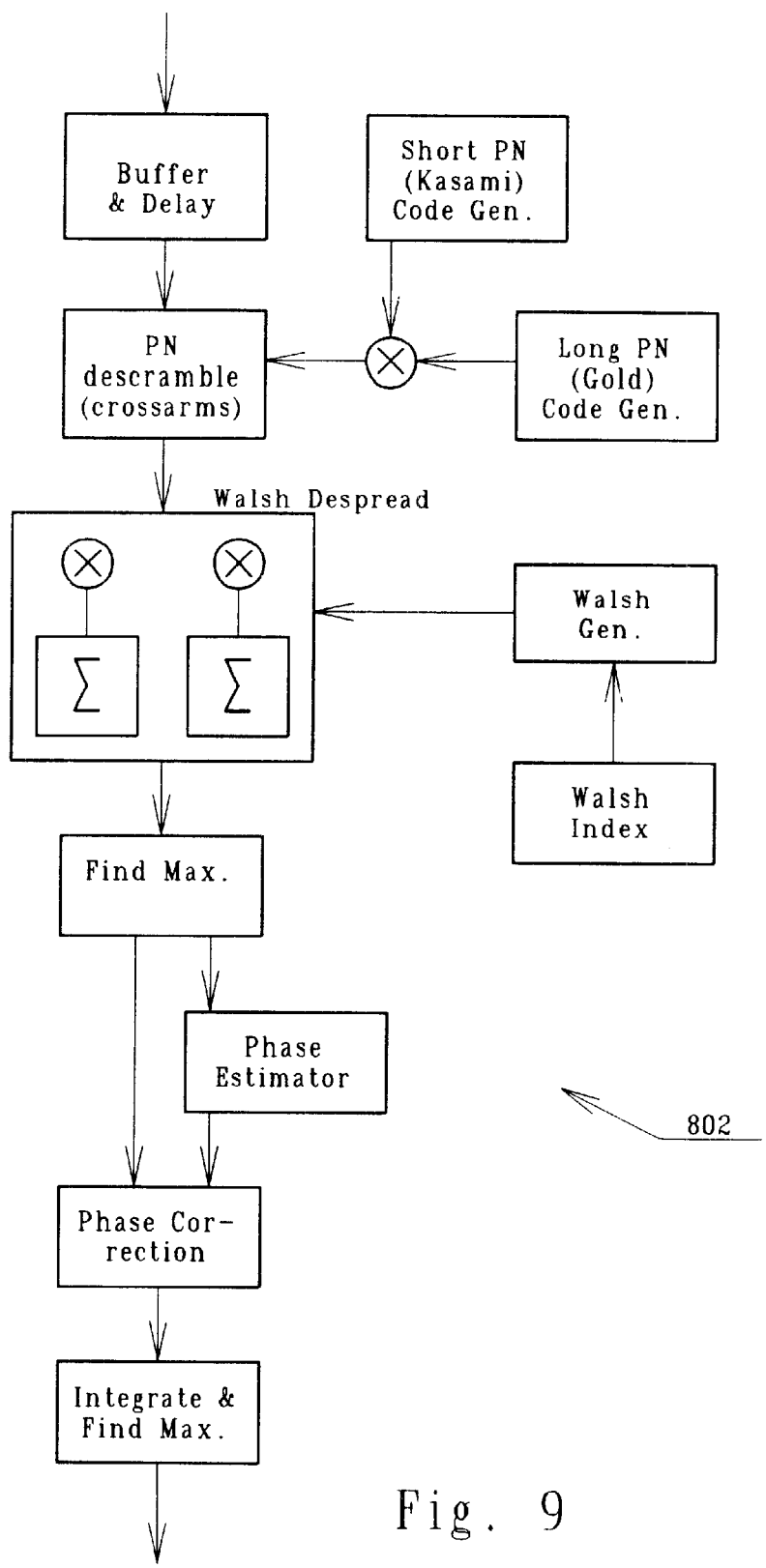
FIG. 9 depicts detail of the searcher fingers of FIG. 8A.

Data Interface 402 of conventional modems is implemented in hardware in the present invention. Searcher 406 of conventional modems is replaced in the present invention by Searcher Fingers 802, depicted in FIG. 9. It is economic to provide such functions as buffering, delaying, descrambling, and despreading largely in hardware, but remaining functions such as control, providing of codes, and interpretation of results are amenable to software solution.

Figure 10:
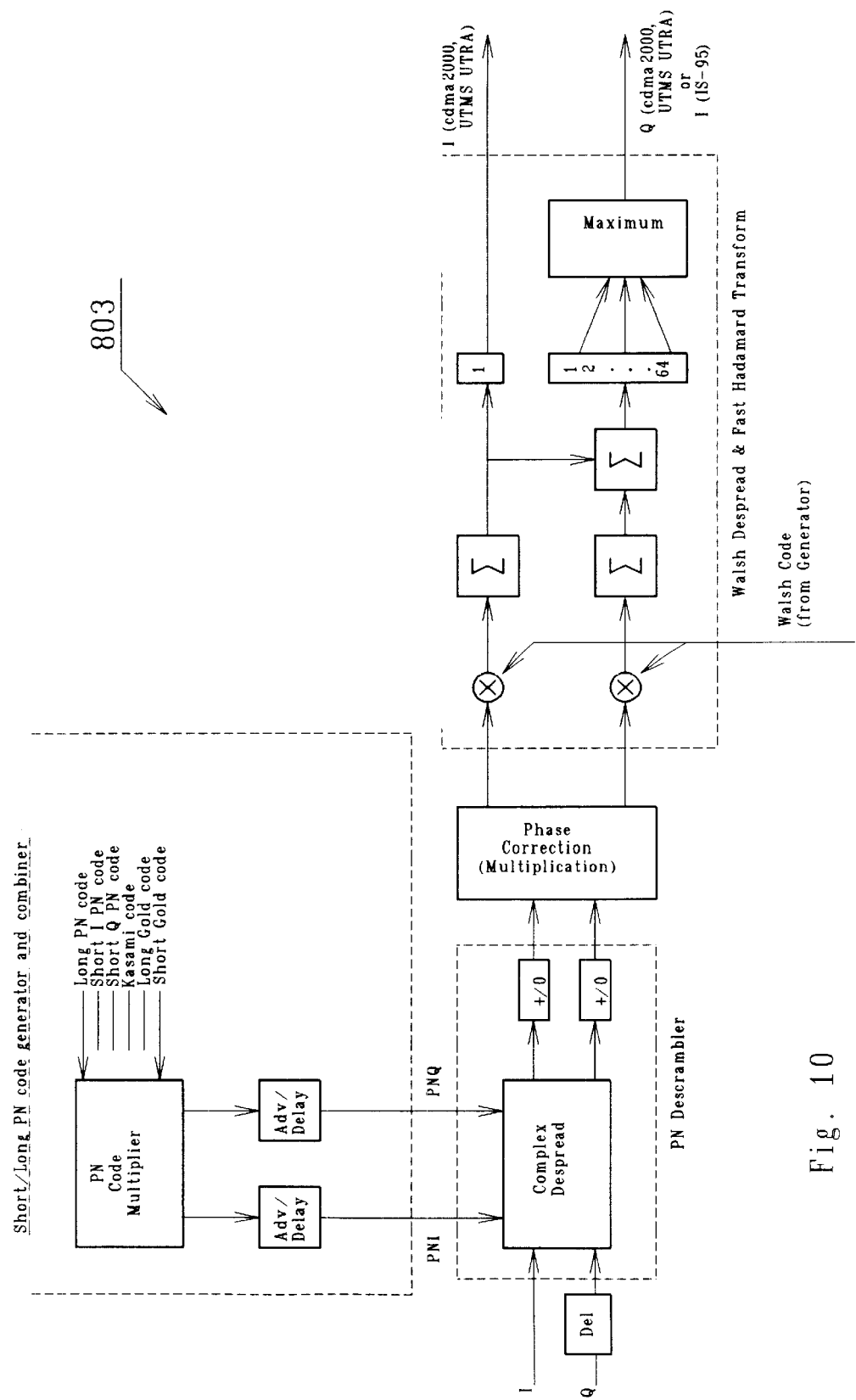
FIG. 10 depicts detail of the rake receiver fingers of FIG. 8A.

Rake Fingers 404 of conventional modems are replaced in the present invention by Rake Fingers 803, depicted in FIG. 10. Some of Rake Fingers 803's functions, such as Complex Despreading, Walsh despreading, PN code multiplication, and Phase Correction are amenable to hardware solution while PN Code determination is amenable to software solution. It is a design choice whether to perform the Fast Hadamard Transform in hardware or software.

Finger Data Fetch function 801, for setting up the Searcher Fingers and the Rake Fingers, is best performed in software. SIR Measure 804, Finger Control 806, Tracking Control 808, and Combiner 408 lend themselves to software solution. Multicarrier Multiplexer 828, provided for multi-carrier applications, is best done in hardware.

Figure 18:
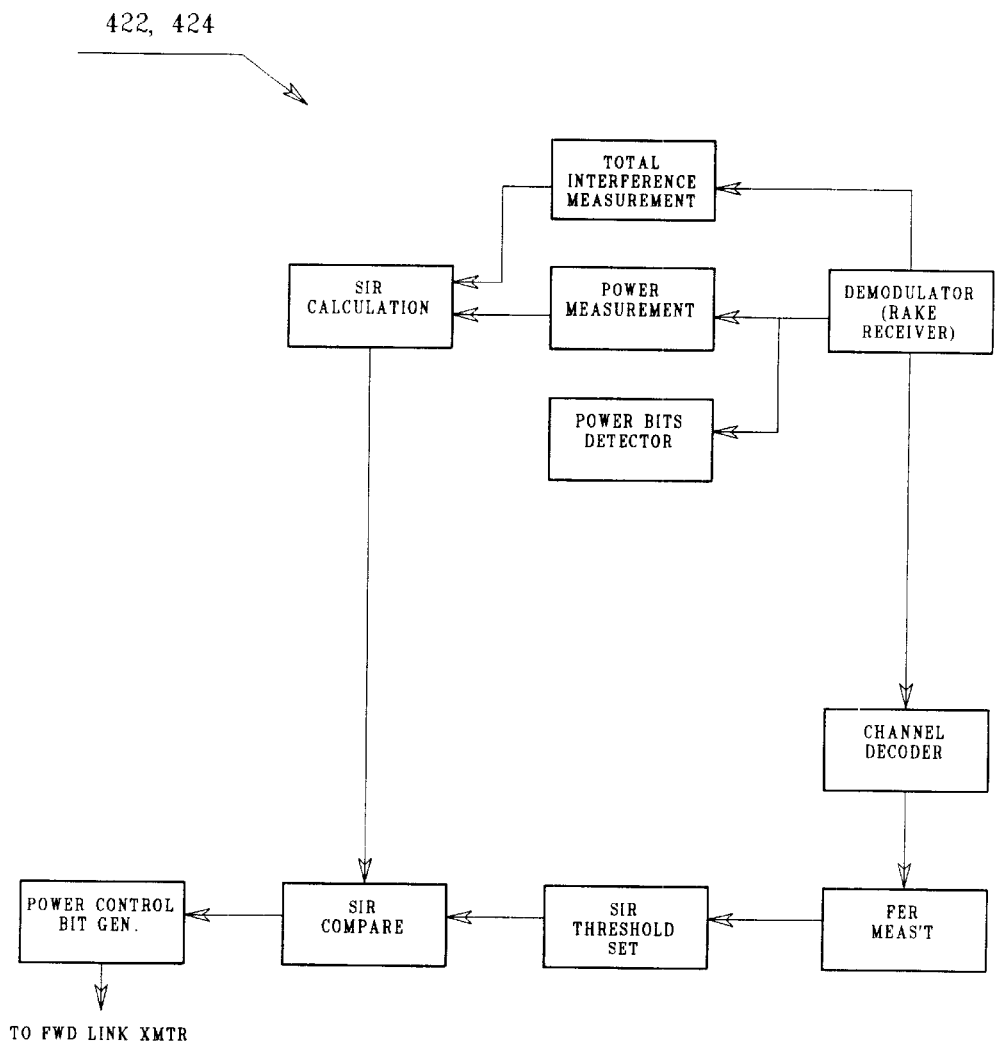
FIG. 18 depicts the power control portion of the present invention.
Figure 19:
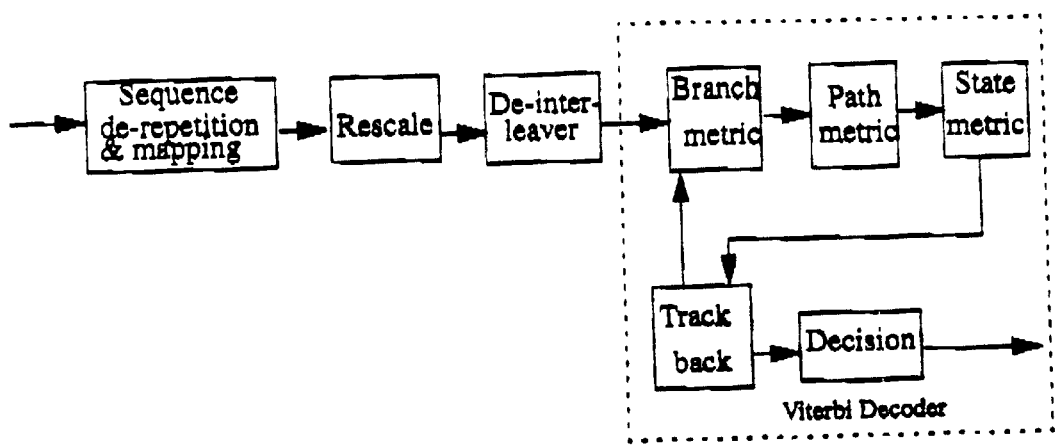
FIG. 19 depicts channel decoding of the present invention.

Power Control Bit Detection 422 is given in FIG. 18 and is amenable to software solution.

Figure 20:
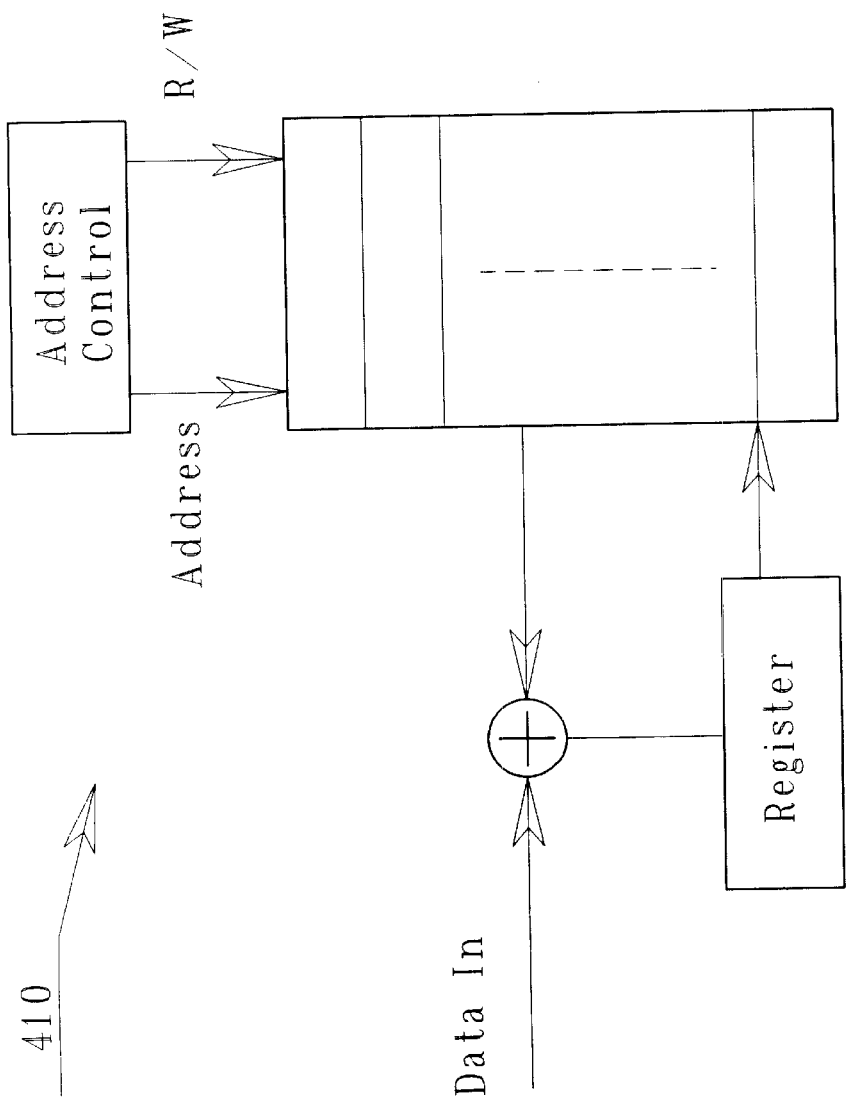
FIG. 20 depicts sequence derepetition of the present invention.

A hardware solution for Sequence and Symbol Derepetiton 410 is given in FIG. 20.

Deinterleaver 412 can be implemented by the table lookup and software-controlled address generator of FIG. 14, similarly to the Interleaver 110.

Provision of polynomials to CRC detectors 810 and 812 and to Reed-Solomon decoder 416 may be accomplished in software, regardless of whether those units are in software or hardware.

Figure 13:
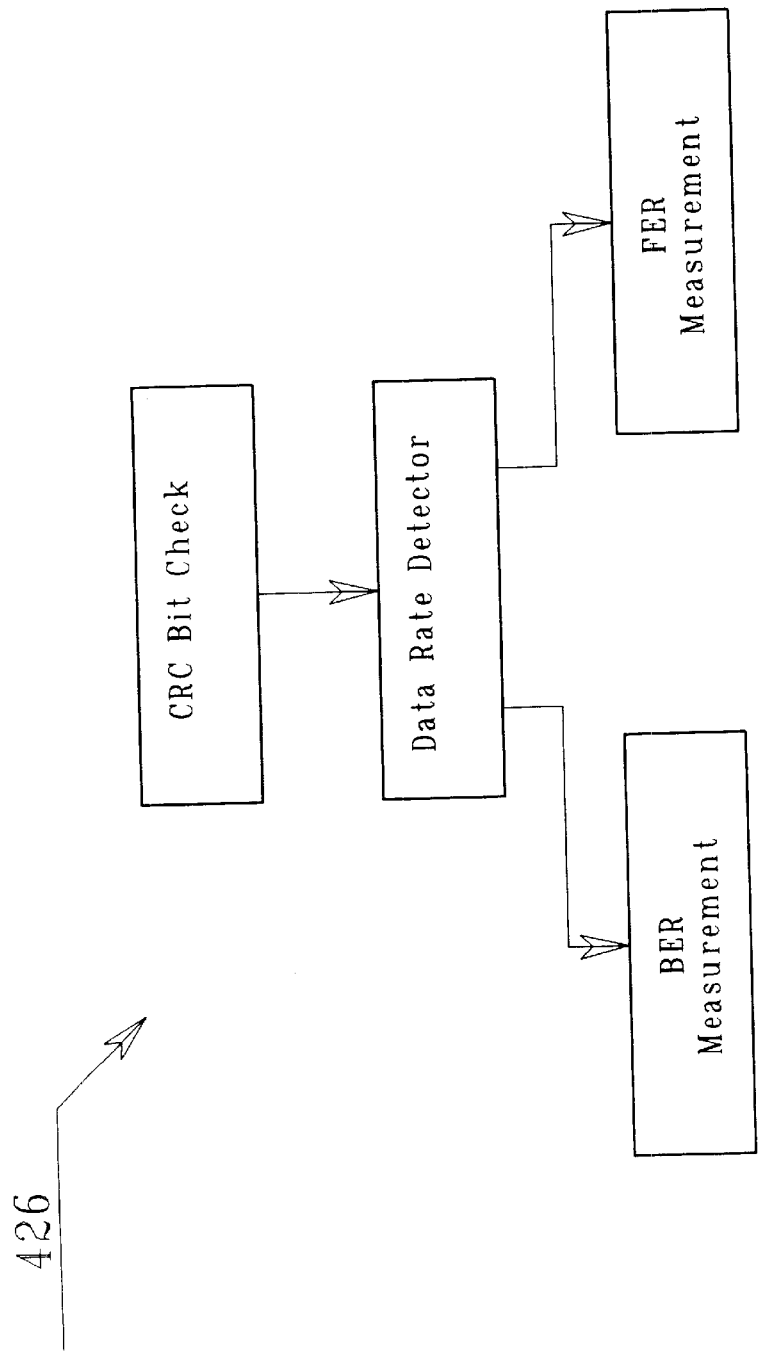
FIG. 13 depicts a BER/FER detector for use in CDMA systems.

BER and FER determination is given in FIG. 13; the parameters input to it from block 820 are best provided by software. CC Coders 814 and 816 re-encode the received signal as necessary for BER and FER determination, and provide it BER 426 through multiplexer 818.

Power Control 424 is given in FIG. 18.

As with the receiver of FIG. 7, timing signals for the different standards may be obtained from the common clock generator of FIG. 11, and codes may obtained from the code generator depicted in FIG. 16.

It will thus be seen that the invention efficiently attains the objects set forth above, among those made apparent from the preceding description. In particular, the invention provides a modem whose transmitter and receiver components are selectable and configurable to operate in conjunction with a plurality of air interface standards. Those skilled in the art will appreciate that the configurations depicted in FIGS. 7, 8A, and 8B provide a modem architecture with receiver and transmitter components configurable to work with IS-95, UMTS UTRA, and cdma2000 CDMA systems.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. In a two-way radio system comprising a base station and a plurality of mobile stations wherein the mobile stations may operate under any IS-95-CDMA, UMTS UTRA, or cdma2000 CDMA air interface standards, a method of communicating between the base station and the plurality of mobile stations, the method comprising the steps of:

providing a modem comprising transmitter components and receiver components;

configuring the transmitter components and the receiver components that are functional within all of the IS-95, UMTS UTRA, and cdma2000 interface standards as a first set of components that are hard-wired components; and configuring the transmitter components and the receiver components that are functional within particular ones of the IS-95, UMTS UTRA, and cdma2000 air interface standards as a second set of components being software-configurable.

2. A modem for use with IS-95, UMTS UTRA, and cdma2000 radio systems comprising:

a first set of components being hard-wired transmitter components and receiver components for functions common to IS-95, UMTS UTRA, and cdma2000 air interface standards; and a second of components being software-configurable transmitter components and receiver components configurable to function according to any of IS-95, UMTS UTRA, and cdma2000 air interface standards.

3. A modem according to claim 2, wherein the transmitter components comprise: input means for accepting a data stream to be transmitted via an air interface;

a bit inserter for adding cyclic redundancy check (CRC) bits and tail bits to the data stream according to any of the predetermined air interface standards;

a convolutional encoder for convolutionally encoding the data stream according to any of the predetermined air interface standards;

a symbol handler for performing symbol repetition and symbol puncture in the data stream according to any of the predetermined air interface standards;

an interleaver for interleaving the data stream in accordance with any of the predetermined plurality of air interface standards;

a Long-Code generator for generating Long Codes in accordance with any of the predetermined plurality of air interface standards;

a Long-Code scrambler operatively connected to the Long-Code generator for Long-Code scrambling the data stream in accordance with any of the predetermined plurality of air interface standards;

a quadrature modulator for modulating the data stream according to any of the predetermined air interface standards;

a Walsh-Code generator for generating Walsh Codes in accordance with any of the predetermined plurality of air interface standards;

a Walsh-Code spreader operatively connected to the Walsh-Code generator for Walsh-Code spreading the data stream in accordance with any of the predetermined plurality of air interface standards;

pseudo-noise (PN) code generators for generating PN codes according to any of the predetermined plurality of air interface standards; and a PN scrambler operatively connected to the PN code generators for PN-scrambling the data stream in accordance with any of the predetermined plurality of air interface standards.

4. The modem according to claim 3, wherein the transmitter components further comprise a Reed-Solomon encoder for encoding the data stream in accordance with the cdma2000 and UMTS UTRA air interface standards, and which is not functional when the modem is used in conjunction with the IS-95 CDMA air interface standard.

5. The modem according to claim 3, wherein the transmitter components further comprise a Turbo code encoder for encoding the data stream in accordance with the cdma2000 and UMTS UTRA air interface standards, and which is not functional when the modem is used in conjunction with the IS-95 CDMA air interface standard.

6. The modem according to claim 3. wherein the PN scrambler has no effect when the modem is used in conjunction with the UMTS UTRA air interface standard.

7. The modem according to claim 2, wherein the transmitter components comprise:

input means for accepting a data stream to be transmitted via the air interface.

8. The modem according to claim 7, wherein the transmitter components comprise a bit inserter for adding cyclic redundancy check (CRC) bits and tail bits to the data stream according to any of the predetermined air interface standards.

9. The modem according to claim 7, wherein the transmitter components comprise a convolutional encoder for convolutionally encoding the data stream according to any of the predetermined air interface standards.

10. The modem according to claim 7, wherein the transmitter components comprise a symbol handler for performing symbol repetition and symbol puncture in the data stream according to any of the predetermined air interface standards.

11. The modem according to claim 7, wherein the transmitter components comprise an interleaver for interleaving the data stream in accordance with any of the predetermined plurality of air interface standards.

12. The modem according to claim 7, wherein the transmitter components comprise:

a Long-Code generator for generating Long Codes in accordance with any of the predetermined plurality of air interface standards; and a Long-Code scrambler operatively connected to the Long-Code generator for Long-Code scrambling the data stream in accordance with any of the predetermined plurality of air interface standards.

13. The modem according to claim 7, wherein the transmitter components comprise a quadrature modulator for modulating the data stream according to any of the predetermined air interface standards.

14. The modem according to claim 7, wherein the transmitter components comprise:

a Walsh-Code generator for generating Walsh Codes in accordance with any of the predetermined plurality of air interface standards; and a Walsh-Code spreader operatively connected to the Walsh-Code generator for Walsh-code spreading the data stream in accordance with any of the predetermined plurality of air interface standards.

15. The modem according to claim 7, wherein the transmitter components comprise:

pseudo-noise (PN) code generators for generating PN codes according to any of the predetermined plurality of air interface standards; and a PN scrambler operatively connected to the PN code generators for PN-scrambling the data stream in accordance with any of the predetermined plurality of air interface standards.

16. The modem according to claim 15, wherein the PN scrambler has no effect when the modem is used in conjunction with the UMTS UTRA air interface standard.

17. The modem according to claim 7, wherein the transmitter components further comprise a Reed-Solomon encoder for encoding the data stream in accordance with the cdma2000 and UMTS UTRA air interface standards, and which is not functional when the modem is used in conjunction with the IS-95 air interface standard.

18. The modem according to claim 7, wherein the transmitter components further comprise a Turbo code encoder for encoding the data stream in accordance with the cdma2000 and UMTS UTRA air interface standards, and which is not functional when the modem is used in conjunction with the IS-95 air interface standard.

19. The modem according to claim 2, wherein the receiver components further comprise:

input means for accepting a data stream received over an air interface, converted to baseband, and sampled into digital signals;

a searcher for determining transmission delay of the air interface according to any of the predetermined plurality of air interface standards;

a complex descrambler for descrambling the data stream according to pseudo-noise (PN) codes and Long Codes according to any of the predetermined plurality of air interface standards;

code generators operatively connected to the descrambler for generating PN codes and Long Codes according to any of the predetermined plurality of air interface standards;

a Walsh despreader for Walsh-Code despreading of the data stream according to any of the predetermined plurality of air interface standards;

a Walsh-Code generator operatively connected to the Walsh despreader for generating Walsh Codes according to any of the predetermined plurality of air interface standards;

a Hadamard transformer for selecting elements of a despread data stream from the outputs of the Walsh despreader in accordance with the IS-95 standard, and not functional when the modem is used with the cdma2000 or UMTS UTRA standards;

a bit detector for power control according to the cdma2000 or UMTS UTRA air interfaces;

a symbol derepeater for performing symbol derepetition on the data stream according to any of the predetermined plurality of air interface standards;

a sequence derepeater for performing sequence derepetition on the data stream according to any of the predetermined plurality of air interface standards;

a deinterleaver for deinterleaving the data stream in accordance with any of the predetermined plurality of air interface standards;

at least one Viterbi decoder for decoding the data stream in accordance with parameters predetermined according to any of the predetermined plurality of air interface standards;

at least one cyclic redundancy detector for checking the data stream in accordance with parameters predetermined according to any of the predetermined plurality of air interface standards;

a Reed-Solomon decoder for decoding the data stream in accordance with the cdma2000 or UMTS UTRA air interface standards, and having no effect on the data stream in conjunction with the IS-95 air interface standard;

a turbo code decoder for decoding the data stream in accordance with the cdma2000 or UMTS UTRA air interface standards, and having no effect on the data stream in conjunction with the IS-95 air interface standard;

an error rate detector for determining bit error rate and frame error rate of the data stream according to parameters predetermined according to any of the predetermined plurality of air interface standards; and a power controller responsive to at least the bit error rate and frame error rate for controlling power level over the air interface.

20. The modem according to claim 2, wherein the receiver components further comprise input means for accepting a data stream received over an air interface, converted to baseband, and sampled into digital signals.

21. The modem according to claim 20, wherein the receiver components further comprise:

a complex descrambler for descrambling the data stream according to pseudo-noise (PN) codes and Long Codes according to any of the predetermined plurality of air interface standards;

code generators operatively connected to the complex descrambler for generating PN codes and Long Codes according to any of the predetermined plurality of air interface standards.

22. The modem according to claim 20, wherein the receiver components further comprise:

a Walsh despreader for Walsh-Code despreading of the data stream according to any of the predetermined plurality of air interface standards;

a Walsh-Code generator operatively connected to the Walsh despreader for generating Walsh Codes according to any of the predetermined plurality of air interface standards.

23. The modem according to claim 20, wherein the receiver components further comprise a Hadamard transformer for selecting elements of a despread data stream from the outputs of the Walsh despreader in accordance with the IS-95 standard, the Hadamard transformer having no effect when used with the cdma2000 or UMTS UTRA air interface standards.

24. The modem according to claim 20, wherein the receiver components further comprise a bit detector for power control according to the cdma2000 or UMTS UTRA air interfaces.

25. The modem according to claim 20, wherein the receiver components further comprise a symbol derepeater for performing symbol derepetition on the data stream according to any of the predetermined plurality of air interface standards.

26. The modem according to claim 20, wherein the receiver components further comprise a sequence derepeater for performing sequence derepetition on the data stream according to any of the predetermined plurality of air interface standards.

27. The modem according to claim 20, wherein the receiver components further comprise a deinterleaver for deinterleaving the data stream in accordance with any of the predetermined plurality of air interface standards.

28. The modem according to claim 20, wherein the receiver components further comprise at least one Viterbi decoder for decoding the data stream in accordance with parameters predetermined according to any of the predetermined plurality of air interface standards.

29. The modem according to claim 20, wherein the receiver components further comprise at least one cyclic redundancy detector for cyclic-redundancy checking the data stream in accordance with parameters predetermined according to any of the predetermined plurality of air interface standards.

30. The modem according to claim 20, wherein the receiver components further comprise a Reed-Solomon decoder for decoding the data stream in accordance with the cdma2000 or UMTS UTRA air interface standards, and having no effect on the data stream in conjunction with the IS-95 air interface standard.

31. The modem according to claim 20, wherein the receiver components further comprise a Turbo code decoder for decoding the data stream in accordance with the cdma2000 or UMTS UTRA air interface standards, and having no effect on the data stream in conjunction with the IS-95 air interface standard.

32. The modem according to claim 20, wherein the receiver components further comprise an error rate detector for determining bit error rate and frame error rate of the data stream according to parameters predetermined according to any of the predetermined plurality of air interface standards.

33. The modem according to claim 32, wherein the receiver components further comprise a power controller responsive to at least the bit error rate and frame error rate for controlling power level over the air interface.

34. The modem according to claim 20 wherein the receiver components further comprise a searcher for determining a transmission delay of the system.

* * * * *